Patented Sept. 1, 1936

2,052,744

UNITED STATES PATENT OFFICE 2,052,744

PROCESS OF ISOMERIZING METHYL CHAVICOL

Carlisle H. Bibb, Pensacola, Fla., assignor to Newport Industries, Inc., Pensacola, Fla., a corporation of Delaware No Drawing. Application December 4, 1935, Serial No. 52,809

8 Claims. (Cl. 260—150)

This invention relates to a simplified method of isomerizing methyl chavicol to anethol in the presence of caustic alkali.

More specifically this invention relates to the isomerization of methyl chavicol into anethol at high velocity in the presence of finely divided caustic alkali compounds.

Methyl chavicol is found in pine oil in amounts generally around 4% or more. By various means, such as by fractional distillation, it can be concentrated to a solution containing 25% or more methyl chavicol. The other principal constituents in the pine oil fraction containing 25% or more methyl chavicol are fenchyl alcohol, various unknown tertiary alcohols, borneol and alpha terpineol.

It is known that methyl chavicol can be isomerized to anethol by boiling the methyl chavicol containing solution with an alcoholic solution of sodium or potassium hydroxide or with an alcoholic solution of the sodium or potassium alcoholate. Under such conditions the velocity of the reaction is very slow, the amount of alkali catalyzer is relatively large and the process requires large amounts of alcohol which may or may not be recovered.

It has also been demonstrated that when pine oil solutions of methyl chavicol are heated with lump caustic soda about 24 hours are required to isomerize approximately all of the methyl chavicol into anethol using about 5% caustic soda based on the weight of the oil.

I have now found that, when finely divided caustic alkali is used, amounts as low as ½% are sufficient to complete the isomerization of methyl chavicol into anethol in about 2 hours.

It is therefore an object of this invention to provide a high speed process for isomerizing methyl chavicol into anethol.

A further object of this invention is to provide a process for converting methyl chavicol into anethol using only small amounts of catalyst.

Another object of this invention is to isomerize methyl chavicol into anethol in high yields and at a relatively high rate of speed.

A specific object of this invention is to isomerize methyl chavicol into anethol in the presence of small amounts of finely divided caustic soda.

Other and further objects will be apparent from the following detailed description of a preferred embodiment of this invention.

The following example is intended to illustrate one method of carrying out the invention and it should be understood that the invention is not limited to the specific ingredients and proportions indicated.

Example 1000 gallons of pine oil or pine oil fraction containing methyl chavicol is heated to boiling at atmospheric pressure and 10 gallons of 50% caustic soda solution is slowly run in while any water present in the still is distilled out at the same time. Thus the water distills out of the oil, caustic soda solution as it is fed into the oil, leaving the caustic soda in a very finely divided state and in contact with the oil. The oil is then boiled for about 2 hours when the reaction will be practically complete. Because of the small amount of caustic soda used, the oil can be distilled through a fractionating column to remove the various constituents other than anethol since the anethol is now the highest boiling component of any consequence in the oil. The anethol so obtained is then recovered from the mixture remaining in the still by fractional distillation to get a relatively pure grade of anethol.

If larger amounts of caustic soda are used the problem of purifying the anethol becomes more complicated and will result in loss of yield. One reason for this is because caustic soda at such high temperatures tends to split the ether linkage on methyl chavicol and form the sodium compound of the resulting phenol. Less caustic soda can be used than indicated in the above example and it will still catalyze the isomerization although the velocity of the reaction might be less.

I do not wish to be limited to the amounts of caustic alkali used since my invention comprises the use of caustic alkali in a finely divided dry state to catalyze the isomerization. The temperature during the boiling and isomerization is generally around 200° C. but the temperature affects the velocity of the reaction and not the final result, so that the process is adapted to a wide range of temperatures.

From the above description it should be understood that my invention comprises the boiling of pine oil or a fraction of pine oil containing methyl chavicol with finely divided caustic alkali so as to effect the isomerization of methyl chavicol into anethol at high speed. I have used various types of caustic alkalies such as, for example, sodium hydroxide, potassium hydroxide, lithium hydroxide and the like.

In describing the introduction of caustic soda solution into the boiling oil, I have disclosed a preferred method for creating a finely divided form of caustic soda in intimate contact with the oil. By practicing this invention it is apparent that unusually small quantities of caustic soda are effective. The exact manner in which this finely divided form acts is not well understood especially as to whether the isomerization takes place on the solid caustic soda, or whether such a form creates a greater solution pressure and thus forces into solution more caustic soda than the lump form. In any event the amount of caustic soda dissolved is very small but the temperature is high, that is, 200° C. or over. So long as the methyl chavicol bearing oil is thus heated in the presence of finely divided dry caustic soda, the desired reaction takes place rapidly.

Other means may be used for creating the finely divided form of caustic soda without departing from this invention. For instance, an alcoholic solution of caustic soda may be introduced into the boiling oil and the alcohol distilled off leaving the caustic soda in a dry finely divided form. Or powdered caustic soda may contain sufficient water to be liquid at the temperatures employed to create a finely divided form when boiled with the oil and the water thus removed.

I am aware that numerous details of the process may be varied through a wide range without departing from the principles of this invention, and I, therefore, do not purpose limiting the patent granted hereon otherwise than necessitated by the prior art.

I claim:

1. The process of converting methyl chavicol into anethol which comprises heating methyl chavicol in the presence of dry finely divided caustic alkali at temperatures sufficient to effect isomerization of said methyl chavicol.

2. The process of converting methyl chavicol into anethol which comprises heating the methyl chavicol in the presence of dry finely divided caustic soda at temperatures sufficient to effect isomerization of said methyl chavicol.

3. The method of isomerizing methyl chavicol into anethol which comprises boiling methyl chavicol containing solutions in the presence of finely divided caustic alkali.

4. The method of converting methyl chavicol into anethol which comprises heating pine oil at its boiling temperature in the presence of dry finely divided caustic alkali for about two hours, distilling off the constituents other than anethol from the mass and recovering the anethol.

5. The process of converting the methyl chavicol in pine oil into anethol which comprises heating pine oil to its boiling temperature, introducing an aqueous solution of caustic alkali into the boiling oil, distilling off the water from the aqueous solution, heating the oil and the resulting finely divided caustic alkali mixture at the boiling temperature for about two hours, distilling off the pine oil constituents having boiling points lower than anethol and recovering a fraction of relatively pure anethol.

6. The process of isomerizing methyl chavicol to anethol which comprises heating pine oil in the presence of about one-half percent of finely divided caustic soda to a boiling temperature for about two hours, distilling off the ingredients of the pine oil having boiling points lower than anethol and recovering a fraction of relatively pure anethol.

7. The process of converting methyl chavicol into anethol which comprises heating a pine oil fraction containing about twenty-five percent methyl chavicol to temperatures around 200° C., introducing an aqueous solution of caustic soda into the heated mass until about one-half percent of caustic soda, based on the weight of the oil, is added, continuing the heating for about two hours, and recovering a fraction of relatively pure anethol by fractional distillation of the oil.

8. The step in the process of isomerizing methyl chavicol consisting in introducing a solution of caustic alkali into methyl chavicol bearing oil, and distilling out the caustic alkali solvent.

CARLISLE H. BIBB.